United States Patent
Sato et al.

(10) Patent No.: US 9,128,196 B2
(45) Date of Patent: Sep. 8, 2015

(54) RADIATION IMAGING APPARATUS AND RADIATION IMAGING SYSTEM

(71) Applicant: CANON KABUSHIKI KAISHA, Tokyo (JP)

(72) Inventors: Sho Sato, Saitama (JP); Toshio Kameshima, Kumagaya (JP); Tomoyuki Yagi, Honjo (JP); Katsuro Takenaka, Honjo (JP); Hideyuki Okada, Honjo (JP); Atsushi Iwashita, Saitama (JP); Eriko Sato, Tokyo (JP); Takuya Ryu, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/292,230

(22) Filed: May 30, 2014

(65) Prior Publication Data

US 2014/0361184 A1  Dec. 11, 2014

(30) Foreign Application Priority Data

Jun. 5, 2013  (JP) .................................. 2013-118992

(51) Int. Cl.
  *G01T 1/24* (2006.01)
  *G01T 1/29* (2006.01)
  *H04N 5/32* (2006.01)

(52) U.S. Cl.
  CPC ............... *G01T 1/247* (2013.01); *G01T 1/2928* (2013.01); *H04N 5/32* (2013.01)

(58) Field of Classification Search
  CPC .......... G01T 1/24; G01T 1/2928; G01T 1/247
  USPC ................................................... 250/370.08
  See application file for complete search history.

(56) References Cited

U.S. PATENT DOCUMENTS

| 7,227,926 B2 | 6/2007 | Kameshima et al. |
| 7,343,000 B2 | 3/2008 | Kameshima et al. |
| 7,403,594 B2 | 7/2008 | Endo et al. |
| 7,421,063 B2 | 9/2008 | Takenaka et al. |
| 7,541,591 B2 | 6/2009 | Endo et al. |

(Continued)

FOREIGN PATENT DOCUMENTS

JP  2010-268171 A  11/2010

OTHER PUBLICATIONS

U.S. Appl. No. 14/290,479, filed May 29, 2014.

*Primary Examiner* — David J Makiya
*Assistant Examiner* — Taeho Jo
(74) *Attorney, Agent, or Firm* — Fitzpatrick, Cella, Harper & Scinto

(57) ABSTRACT

A radiation imaging apparatus comprises a conversion element and a transistor. A drive unit performs a reset operation at a plurality of times, by supplying a conducting voltage to gates of the transistors, successively, one row by one row, an operation of stopping the supplying of the conducting voltage responsive to detecting the irradiation of the radiation to perform an accumulation operation and, after the reset operation, a read out operation. During the reset operation, a period between the supplying the conducting voltage to the gates of the transistors in one row and the supplying the conducting voltage subsequently to the gates of the transistors in another row is different from a period between the supplying the conducting voltage to the gates of the transistors in the another row and the supplying the conducting voltage subsequently to the gates of the transistors in further another row.

8 Claims, 10 Drawing Sheets

(56) References Cited

U.S. PATENT DOCUMENTS

| | | |
|---|---|---|
| 7,573,038 B2 | 8/2009 | Yokoyama et al. |
| 7,613,277 B2 | 11/2009 | Takenaka et al. |
| 7,869,568 B2 | 1/2011 | Yokoyama et al. |
| 7,994,481 B2 | 8/2011 | Yagi et al. |
| 2004/0159794 A1* | 8/2004 | Morii et al. ............... 250/370.11 |
| 2005/0220269 A1* | 10/2005 | Endo et al. .................... 378/114 |
| 2011/0024641 A1* | 2/2011 | Yokoyama et al. ...... 250/370.08 |
| 2011/0286582 A1* | 11/2011 | Iwashita et al. ............... 378/146 |
| 2011/0317054 A1* | 12/2011 | Kameshima et al. ......... 348/302 |
| 2012/0075600 A1* | 3/2012 | Sato et al. ...................... 355/18 |
| 2012/0170827 A1* | 7/2012 | Yagi et al. ..................... 382/132 |
| 2012/0241634 A1* | 9/2012 | Kameshima et al. .... 250/370.08 |
| 2013/0240712 A1* | 9/2013 | Takenaka et al. .......... 250/208.1 |
| 2013/0264488 A1 | 10/2013 | Sugawara et al. |
| 2013/0322597 A1* | 12/2013 | Uchiyama ...................... 378/62 |
| 2014/0061491 A1 | 3/2014 | Iwashita et al. |
| 2014/0112448 A1 | 4/2014 | Takenaka et al. |
| 2014/0239186 A1 | 8/2014 | Sato et al. |
| 2014/0239187 A1 | 8/2014 | Iwashita et al. |
| 2014/0241501 A1 | 8/2014 | Sato et al. |
| 2014/0241506 A1 | 8/2014 | Iwashita et al. |

* cited by examiner

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system which are suitably used for a diagnosis for medical use and a non-destructive test for industrial use.

2. Description of the Related Art

In a radiation imaging apparatus having a pixel array in which a plurality of pixels each including a transistor that supplies a desired potential to a conversion element for converting X-rays or light into electric charge are arranged, an electric charge which has been generated by a dark current occurring in each of the plurality of pixels is required to be reset before the radiation imaging apparatus is irradiated with a radiation. For this reason, among such radiation imaging apparatuses, there is a radiation imaging apparatus which performs a reset operation of resetting an electric charge of the pixel periodically, by sequentially setting the transistors of the plurality of pixels at a conducting state periodically to reset the conversion element, before the radiation imaging apparatus is irradiated with the radiation.

Japanese Patent Application Laid-Open No. 2010-268171 discloses a radiation imaging apparatus which detects an electric current flowing in a bias wire that supplies a bias to a conversion element therethrough while performing the reset operation, and detects an irradiation of the radiation from a radiation generating apparatus. It is also disclosed to stop a dummy read operation corresponding to the reset operation, in response to the irradiation of the radiation. When the reset operation is stopped, the operation is shifted to an accumulation operation which sets all of transistors at a non-conducting state so that the pixel accumulates the electric charge according to the irradiation of the radiation. Furthermore, after a predetermined time period (accumulation time period) has passed from the time when the accumulation operation has started, a real reading operation is started which corresponds to a read out operation of successively reading out the electric charge as a pixel signal. Here, it is disclosed to enhance reset efficiency by setting a time period during which the transistor is in the conducting state in the reset operation, so that the time period becomes longer than a conducting time period of the transistor in the read out operation.

However, when the radiation imaging apparatus is structured so as to detect a bias current while performing the reset operation and detect the start of the irradiation of the radiation, and the like, as has been described above, there exist the following problems. Specifically, a part of a signal electric charge which has been generated by the irradiation of the radiation results in being lost from the conversion element in which the reset operation has been performed in a period between the start of the irradiation of the radiation and the detection of the start of the irradiation of the radiation. Because of this, as the conducting time period of the transistor in the reset operation is longer, the influence becomes larger. For this reason, it is desirable to shorten the conducting time period of the transistor in the reset operation, in order to obtain an image having a small artifact. Specifically, it is desirable to shorten a time period during which the transistors in all of the pixels are sequentially reset at the conducting state to be reset in the reset operation (hereinafter referred to as time cycle of reset operation).

However, on the other hand, when the time cycle of the reset operation is shortened in order to obtain the image having the small artifact, there arises a problem that detecting capability at the time when the radiation imaging apparatus detects the irradiation of the radiation results in being lowered, as has been described above.

SUMMARY OF THE INVENTION

An object of the present invention is to provide a radiation imaging apparatus and a radiation imaging system which acquire a high-quality radiation image and can enhance the capability of detecting the radiation.

According to an aspect of the present invention, a radiation imaging apparatus comprises: a plurality of conversion elements configured to convert radiation into an electric charge, and arranged in a matrix; a plurality of transistors connected between the plurality of conversion elements and a read out circuit; a drive unit configured to supply, to a gate of the transistor, selectively, a conducting voltage setting the transistor at a conducting state, and a non-conducting voltage setting the transistor at a non-conducting state; and a detecting unit configured to detect an irradiation of the radiation, wherein the drive unit performs: a first operation of performing a reset operation at a plurality of times, by supplying the conducting voltage to the gates of the plurality of transistors, successively, one row by one row, at least; a second operation of stopping the supplying of the conducting voltage in response to a detecting the irradiation of the radiation by the detecting unit, and of performing an accumulating operation by supplying the non-conducting voltage to the gates of the plurality of transistors; and a third operation of performing, after the second operation, a read out operation by supplying the conducting voltage to the gates of the plurality of transistors, successively, one row by one row, and, during the first operation, a period between a time of supplying the conducting voltage to the gates of the transistor in one row and a time of supplying the conducting voltage to the gates of the transistor in a next row is different from a period between a time of supplying the conducting voltage to the gates of the transistor in the next row and a time of supplying the conducting voltage to the gates of the transistor in a further next row.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 4:
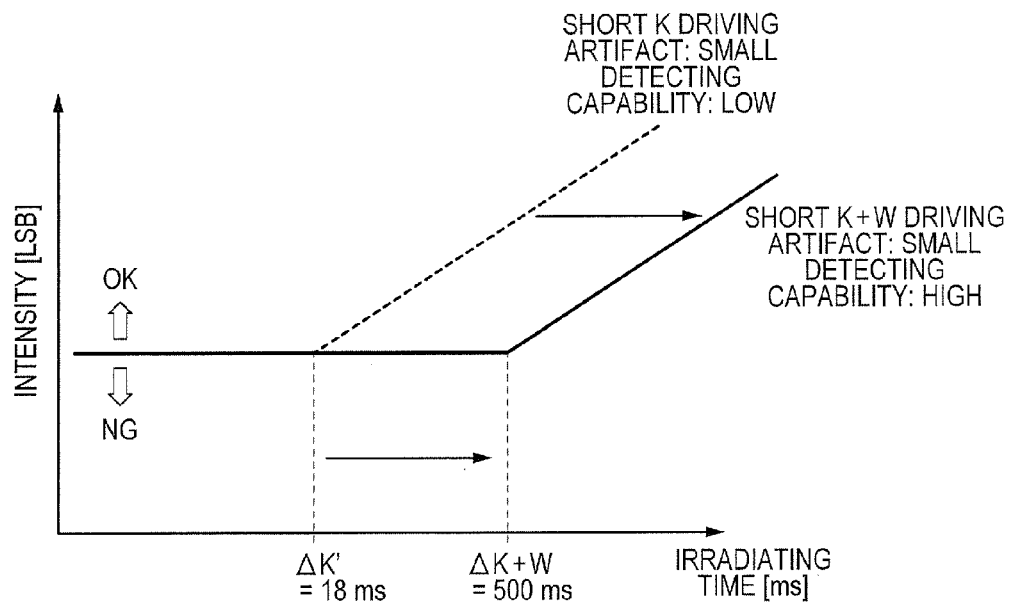
FIG. 4 is a view for describing an effect of the first embodiment.

The capability of detecting the radiation of a radiation imaging apparatus will be described below. The present inventors have found out the following results, as are illustrated in FIG. 4.
(1) The detecting capability can be expressed by [LSB] in an ordinate axis, when an abscissa axis indicates an irradiation time period [ms] of radiation and the ordinate axis indicates an average value of an image of an object which has been irradiated with radiation.
(2) On an irradiation condition of the radiation, a region in which the average value of the image of the object which has been irradiated with the radiation is large is a detectable range, and a region in which the average value of the image of the object which has been irradiated with the radiation is small is an undetectable region.
(3) A point at which the gradient of the above described graph changes is a time cycle of a reset operation.

The radiation imaging apparatus can detect the presence or absence of the irradiation of the radiation such as the start and the end of the irradiation of the radiation. It is necessary to correct an artifact on the image, which occurs due to a phenomenon that a part of a signal electric charge which has been generated by the irradiation of the radiation is lost from a conversion element in which the reset operation has been performed before the start of the irradiation of the radiation is detected. When such an image is corrected, the artifact can be corrected with the use of data of a pixel other than the pixel in which the part of the signal electric charge has been lost. In such a case, any signal to be sent from all the pixels in the radiation imaging apparatus must not be lost by a delay of the detection of the start of the irradiation of the radiation, in the reset operation. Specifically, when the irradiation of the radiation has been started in the reset operation for a predetermined pixel out of each of the pixels, the start of the irradiation of the radiation must be detected by the time when the reset operation to be performed for the next predetermined pixel is started. In other words, the start of the irradiation of the radiation must be detected within a time period in the time cycle of the reset operation. For this reason, the limit of a time period between the start of the irradiation of the radiation and the detection of the radiation becomes the time cycle of the reset operation. Specifically, when an irradiation time period of the radiation is so long as to exceed the time period of the time cycle of the reset operation, the radiation imaging apparatus becomes unable to detect the radiation as long as the radiation is not stronger. Then, as is illustrated in FIG. 4, in a region which exceeds the time period of the time cycle of the reset operation, the line in the graph shows a slope diagonally right up. Thereby, when the time cycle of the reset operation is shortened in order to obtain an image having a smaller artifact, the detecting capability at the time when the radiation imaging apparatus detects the irradiation of the radiation is lowered, and it becomes difficult to detect the radiation which has a long irradiation time period and is weak.

Then, embodiments of a radiation imaging system will be described below which acquires a high-quality radiation image, and can enhance the capability of detecting radiation.

Figure 1:
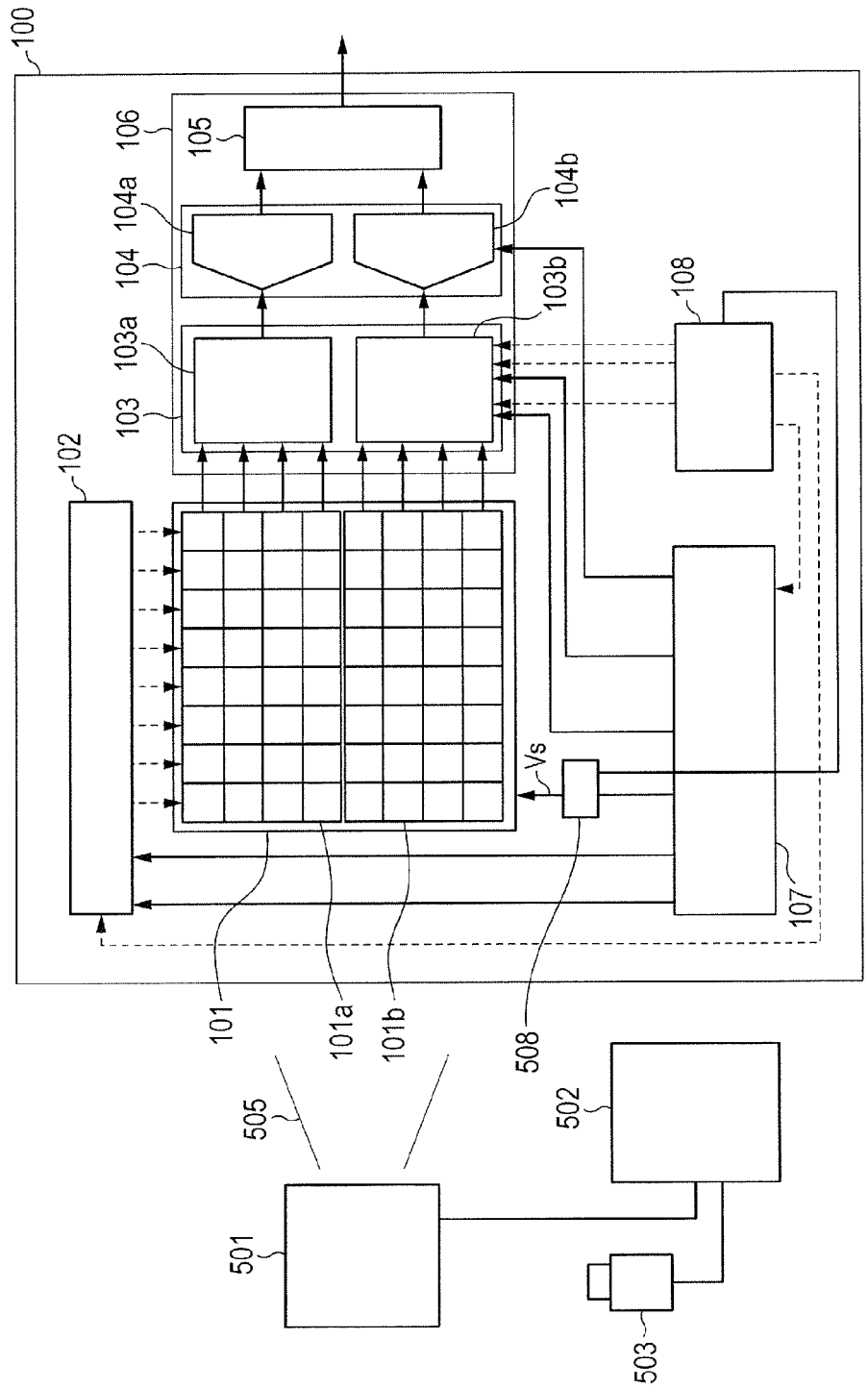
FIG. 1 is a view illustrating a configuration example of a radiation imaging system according to a first embodiment.

FIG. 1 is a view illustrating a configuration example of the radiation imaging system having a radiation imaging apparatus 100 according to a first embodiment of the present invention. The radiation imaging system has the radiation imaging apparatus 100, a radiation source 501, a radiation emitting switch 503 and a radiation control unit 502. When the radiation emitting switch 503 is pressed, the radiation source 501 irradiates the radiation imaging apparatus 100 with a radiation 505 through an object, by a control signal sent from the radiation control unit 502. The radiation 505 is incident on the radiation imaging apparatus 100 through the object.

The radiation imaging apparatus 100 has an imaging unit 101, a drive unit 102, a processing unit 106, a control unit 108 and an electric-current detecting unit 508. The imaging unit 101 has a first imaging unit 101a and a second imaging unit 101b. The processing unit 106 has a read out circuit 103, an analog-digital converter 104 and a signal processing unit 105. The read out circuit 103 has a first read out circuit 103a and a second read out circuit 103b. The analog-digital converter 104 has a first analog-digital converter 104a and a second analog-digital converter 104b. The imaging units 101a and 101b generate a signal according to the radiation which has transmitted the object. The first read out circuit 103a reads out a signal of the first imaging unit 101a, and the second read out circuit 103b reads out a signal of the second imaging unit 101b. The first analog-digital converter 104a converts the signal which has been read out by the first read out circuit 103a, from analog to digital, and the second analog-digital converter 104b converts the signal which has been read out by the second read out circuit 103b, from analog to digital. The signal processing unit 105 processes digital signals which have been converted by the analog-digital converters 104a and 104b. The electric-current detecting unit 508 detects the irradiation of the radiation by detecting an electric current which flows in the imaging unit 101. The control unit 108 outputs a control signal to the drive unit 102 which drives the imaging unit 101, and thereby controls the operation of the imaging unit 101.

Figure 2:
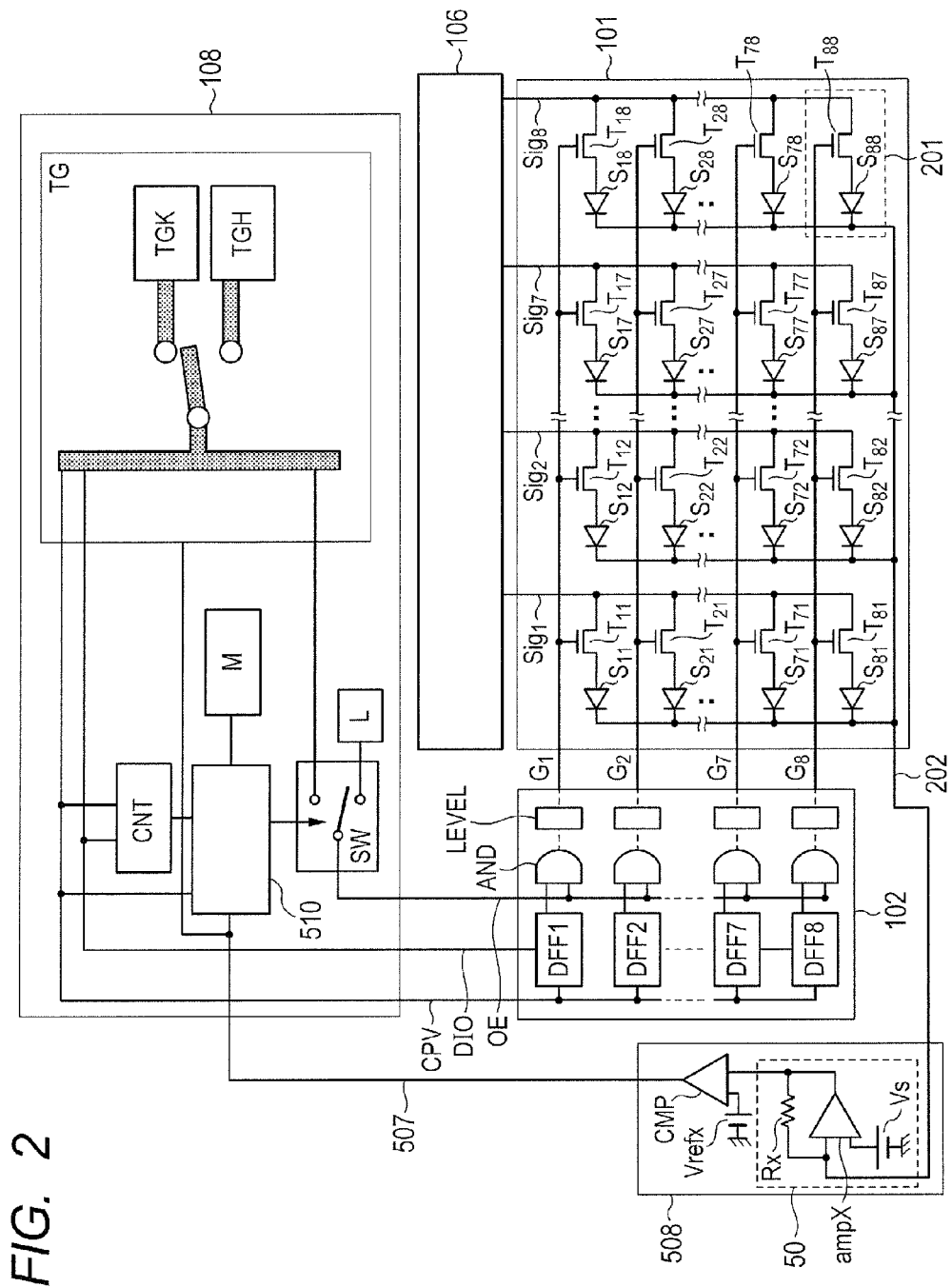
FIG. 2 is a view illustrating a configuration example of a radiation imaging apparatus according to the first embodiment.

FIG. 2 is a view illustrating a configuration example of a part of the radiation imaging apparatus 100 in FIG. 1. The imaging unit 101 has a plurality of pixels 201 which are arranged in a two-dimensional matrix form so as to constitute a plurality of rows and a plurality of columns. Here, the imaging unit 101 is illustrated so that the pixels 201 are arranged so as to constitute 8 rows×8 columns, for simplification. In addition, in the imaging unit 101, signal wires $Sig_1$ to $Sig_8$ are arranged so as to correspond to the pixels 201 in each of the columns, respectively. For instance, the pixel 201 in the m-th row and the n-th column has a conversion element $S_{mn}$ and a transistor $T_{mn}$. The conversion element $S_{mn}$ has a semiconductor between two electrodes, and converts radiation or light into an electric charge. One electrode of the conversion element $S_{mn}$ is electrically connected to the transistor $T_{mn}$, and the other electrode is electrically connected to a sensor bias line 202.

The conversion element $S_{mn}$ directly or indirectly converts the radiation into the electric charge. For instance, a phosphor is provided on the upper part of the conversion element $S_{mn}$. The phosphor converts the radiation into light. The conversion element $S_{mn}$ is, for instance, a PIN type photodiode, an MIS type photoelectric conversion element or the like, which uses amorphous silicon as a semiconductor, and converts the light into the electric charge. Thereby, the conversion element $S_{mn}$ can convert the radiation into the electric charge. For information, the conversion element $S_{mn}$ may be an element which directly converts a radiation into an electric charge with the use of amorphous selenium as a semiconductor. The radiation includes an electromagnetic wave such as X-rays, α-rays, β-rays and γ-rays.

The transistor $T_{mn}$ is, for instance, a thin film transistor (TFT). The transistor $T_{mn}$ has a gate, a source and a drain. One of the source and the drain is connected to one electrode of the conversion element $S_{mn}$, and the other of the source and the drain is connected to the read out circuit 103 (FIG. 1) in the processing unit 106. When a conducting voltage of a signal Gm is supplied to the gate of the transistor $T_{mn}$, the transistor $T_{mn}$ becomes a conducting state, and a signal according to the amount of the electric charge which has been accumulated in the conversion element $S_{mn}$ is output to a signal wire $Sig_n$. At this time, a predetermined constant voltage is supplied to the conversion element $S_{mn}$ through the transistor $T_{mn}$ which is in the conducting state from a constant voltage source of the processing unit 106, and thereby an electric charge which has been generated in the conversion element $S_{mn}$ is reset. The electric charges in the conversion elements $S_{11}$ to $S_{88}$ are reset in response to the conducting voltage of the signals G1 to G8, respectively. Thus, the operation is referred to as the reset operation, which successively converts the transistors $T_{mn}$ in the plurality of rows connected to the constant voltage source, into a conducting state, for the plurality of pixels 201.

The drive unit 102 outputs the signals G1 to G8 to the imaging unit 101. The drive unit 102 selectively supplies a conducting voltage which converts the transistor $T_{mn}$ into the conducting state and a non-conducting voltage that converts the transistor $T_{mn}$ into a non-conducting state, to the gates of the plurality of transistors $T_{11}$ to $T_{88}$, as the signals G1 to G8. The drive unit 102 has, for instance, D flip-flops DFF1 to DFF8 (hereinafter collectively referred to as "DFF") which correspond to the rows of the pixels 201, respectively, and constitutes a shift register. In addition, the drive unit 102 has conjunction circuits AND and level shift circuits LEVEL corresponding to the D flip-flops DFF, respectively. A signal DIO, a signal CPV and a signal OE are input into the drive unit 102 from a timing generator TG. The signal DIO is a starting pulse signal for inputting a signal into the D flip-flop DFF1. The signal CPV is a shift clock signal for shifting a pulse which is held in each of the D flip flops DFF, to the D flip flop DFF in a next stage. The signal OE is an output enable signal for determining whether to output the state which is held in each of the D flip flops DFF, to the corresponding level shift circuit LEVEL, or not. The plurality of conjunction circuits AND output signals of conjunction of the D flips DFF1 to DFF8 with the signal OE, to the level shift circuits LEVEL, respectively. The level shift circuit LEVEL is a circuit which shifts a voltage level. Thus, the drive unit 102 selectively outputs a conducting voltage or non-conducting voltage which is held in each of the D flip flops DFF, to the imaging unit 101, when the signal OE is in a high-level state. The drive unit 102 also outputs a non-conducting voltage to the imaging unit 101, when the signal OE is in a low-level state.

The electric-current detecting unit 508 has an amplifying circuit 50 which is formed of an amplifier ampX and a feedback resistor Rf, and a comparator CMP. The electric-current detecting unit 508 applies a bias voltage Vs to the plurality of conversion elements $S_{11}$ to $S_{88}$, through the bias line 202. The radiation is incident on the imaging unit 101 in response to the irradiation of the radiation, and the corresponding bias current flows to the bias line 202. The amplifying circuit 50 converts an electric current of the bias line 202 into voltage. The comparator CMP compares this converted voltage to a reference potential VrefX, and outputs the result as a signal 507. Thus, the electric-current detecting unit 508 detects that the radiation imaging apparatus has been irradiated with the radiation.

The control unit 108 receives the signal 507, and drives the radiation imaging apparatus 100 in response to the irradiation of the radiation. The control unit 108 has the timing generator TG, a counter CNT, a unit 510, a memory unit M and a switch SW. The unit 510 stores a value according to a counter value of the counter CNT in the memory unit M, in response to the irradiation of the radiation by the signal 507 sent from the electric-current detecting unit 508. In addition, the unit 510 connects the line of the signal OE to the timing generator TG or fixes the line of the signal OE at a low-level state, by switching the switch SW. The timing generator TG generates two types of timings TGK and TGH. The detailed description of the operation will be described below with reference to FIG. 3.

Figure 3:
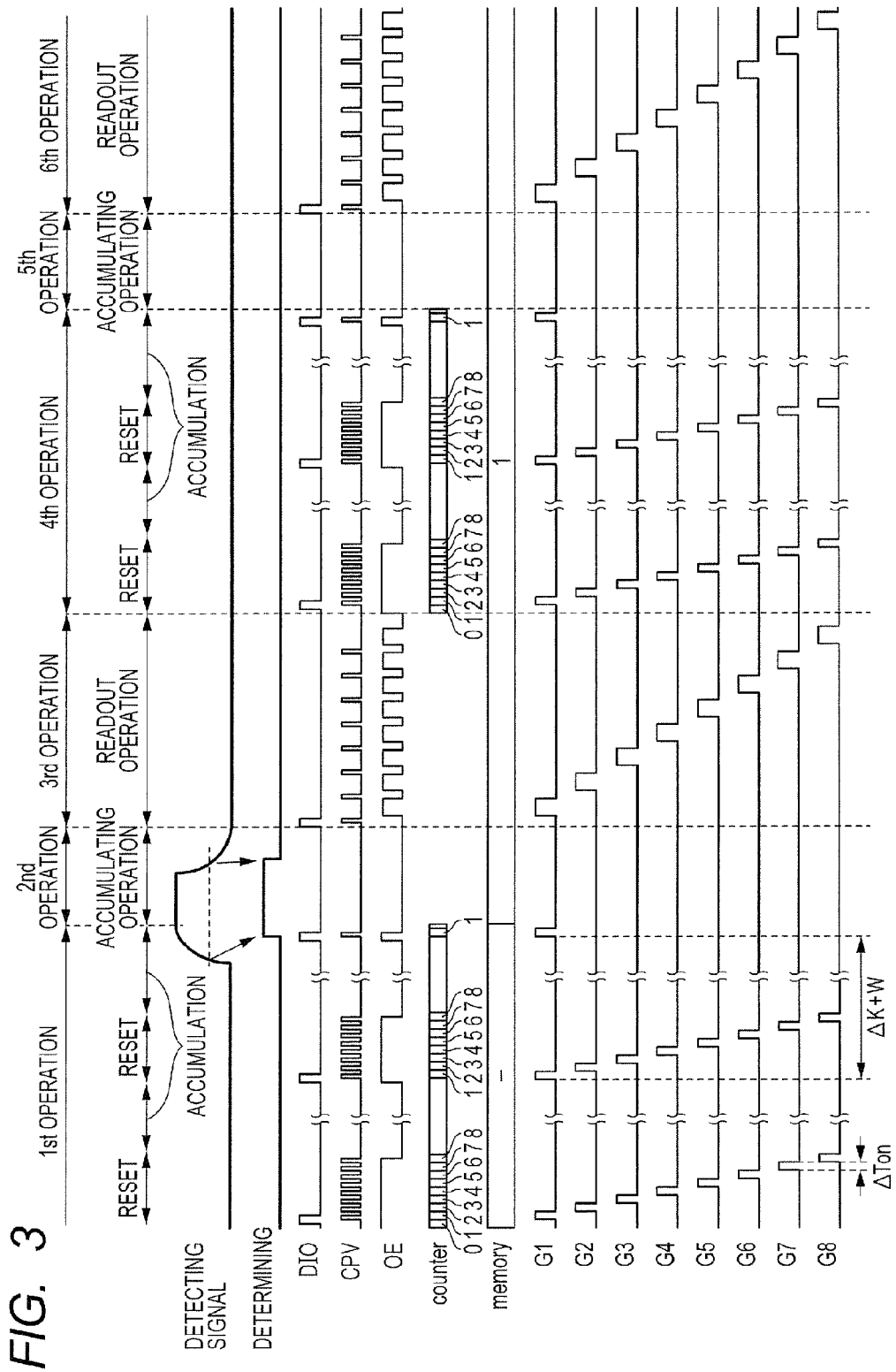
FIG. 3 is a timing chart illustrating a driving method according to the first embodiment.

FIG. 3 is a timing chart for describing the operation of the radiation imaging system. FIG. 3 illustrates a state of an operation of the imaging unit 101, an output value of a detecting signal 507 for detecting that the radiation imaging apparatus has been irradiated with the radiation, and a determination result of the detecting signal 507, sequentially from above. Furthermore, the signals DIO, CPV and OE, the counter which is a counter value of the counter CNT, and an information memory which is memorized in the memory unit M, are illustrated in the underside thereof. In the underside thereof, the signals G1 to G8 are illustrated.

In a first operation, a reset operation of periodically resetting the plurality of pixels 201, one row by one row, at least, and an accumulation operation of setting the transistors $T_{mn}$ at a non-conducting state are alternately performed. In the reset operation, the drive unit 102 sequentially supplies a conducting voltage of the signals G1 to G8, to gates of the transistors $T_{mn}$ in at least one row out of a plurality of rows of the plurality of pixels 201, for a plurality of rows, and all of the pixels 201 are reset. After that, in the accumulation operation, the drive unit 102 supplies the non-conducting voltage of the signals G1 to G8 which set all of the transistors $T_{mn}$ at the non-conducting state, to the gates of the transistors $T_{mn}$. These reset operation and accumulation operation are repeatedly performed at a plurality of times until the radiation imaging apparatus is irradiated with the radiation. Here, the time cycle of the first operation is a time period ΔK+W that is the sum of a time period ΔK necessary for resetting all of the pixels 201, and a time period W of the accumulation operation which sets all of the transistors $T_{mn}$ at a non-conducting state. Specifically, the time cycle of the first operation is a time period between the start of the reset for a certain pixel 201 and the start of the reset for the pixel 201, which will be performed at next time. Alternatively, the time cycle of the first operation is a time period between the end of the reset of a certain pixel 201 and the end of the reset of the pixel 201, which will be performed at the next time. In addition, the reset operation of resetting all the pixels 201 is performed by a sequential activation for the signals G1 to G8 according to the signal CPV, which follows the input of the signal DIO. This reset operation periodically initializes a noise signal component based on a dark current which is generated in each of the plurality of pixels 201. In addition, after the signal DIO has been input, the counter value counter is sequentially counted from 1 to 8 according to the signal CPV. The counter value counter corresponds to the row to be reset. When the counter value counter is 1, for instance, the signal G1 becomes a conducting voltage, and the first row is reset. When the control unit 108 has determined that the detecting signal 507 becomes larger than a threshold and the irradiation of the radiation is started, the control unit 108 controls the drive unit 102 so that the drive unit 102 stops the first operation by stopping the supply of the conducting voltage of the signals G1 to G8 and shifts the operation to a second operation. For instance, the reset operation is stopped at the first row of the signal G1, and the counter value counter is stopped at 1.

The second operation is an accumulation operation in which the conversion element $S_{mn}$ generates an electric charge according to the irradiation of the radiation, and accumulates the electric charge. In the second operation, the drive unit 102 supplies the non-conducting voltage of the signals G1 to G8, which sets the transistor $T_{mn}$ at the non-conducting state to the gate of the transistor $T_{mn}$, in order to accumulate an electric signal according to the electric charge which has been generated in the conversion element $S_{mn}$ in the pixel 201. In the present embodiment, in the accumulation operation, the drive unit 102 supplies the non-conducting voltage of the signals G1 to G8 to the gates of all the transistors $T_{mn}$ in the plurality of pixels 201. In the second operation, each of the pixels 201 accumulates an electric signal therein according to an electric charge including an electric charge which has been generated by that the pixels have been irradiated with the radiation. In addition, in this second operation, the value of the counter value counter is stored in the memory unit M in response to the irradiation of the radiation. Here, "1" of the counter value counter is stored in the memory unit M. When the detecting signal 507 becomes smaller than the threshold, the control unit 108 determines that the irradiation of the radiation has ended, then stops the second operation, and shifts the operation to a third operation.

In the third operation, the control unit 108 controls the drive unit 102 so that the drive unit 102 successively supplies a conducting voltage of the signals G1 to G8 to the gates of the transistors $T_{mn}$ at least in one row out of a plurality of rows of the plurality of pixels 201, for a plurality of rows. The third operation is a read out operation of reading out pixel signals according to the amount of the electric charges accumulated in the conversion elements $S_{mn}$ from the pixels 201, respectively, into the processing unit 106. When the signals G1 to G8 become the conducting voltage, the transistors $T_{11}$ to $T_{88}$ are set at a conducting state one row by one row, and the pixel signals of the conversion elements $S_{11}$ to $S_{88}$ are read out to the signal wires $Sig_1$ to $Sig_8$ one row by one row. In the read out operation, a constant voltage source of the processing unit 106 is not connected to the signal wires $Sig_1$ to $Sig_8$, and the pixel signals are read out to the signal wires $Sig_1$ to $Sig_8$ without being reset. The control unit 108 controls the drive unit 102 so that the drive unit 102 shifts the operation to a fourth operation in response to the end of the third operation.

In the fourth operation, similarly to the first operation, a reset operation of periodically resetting each of the plurality of pixels 201, one row by one row, at least, and an accumulation operation of resetting the transistors $T_{mn}$ at a non-conducting state are alternately performed. The operation of each time cycle in the fourth operation is the same as that of each time cycle in the first operation. The fourth operation ends by stopping the supply of the conducting voltage of the signals G1 to G8, in the row in which the supply of the conducting voltage of the signals G1 to G8 has been stopped in the first operation after the above described time cycle of the first operation has been performed at a plurality of times. The fourth operation is ended according to, for instance, "1" of the information memory stored in the above described memory unit M. Specifically, the reset operation for the signal G1 by the conducting voltage is finally performed, and the fourth operation ends. Here, the time cycle of the first operation has been performed for two time cycles and then the fourth operation is stopped in the third time cycle, but the time cycle must be repeatedly performed at a sufficient number of times for resetting the electric charge which has been generated by the dark current in each of the pixels 201. The time cycle of the first operation can be ended after having been repeatedly performed twice or more times. The control unit 108 controls the drive unit 102 so that the drive unit 102 stops the fourth operation by stopping the supply of the conducting voltage of the signals G1 to G8 in the fourth operation while matching the first operation, ends the fourth operation, and shifts the operation to a fifth operation in response to the end of the fourth operation.

The fifth operation is an accumulation operation in which the drive unit 102 supplies the non-conducting voltage of the signals G1 to G8, which sets the transistors $T_{mn}$ at a non-conducting state, to the gates of the transistors $T_{mn}$, in order to accumulate an electric signal according to the electric charge which has been generated in the conversion element $S_{mn}$ in the pixel 201, similarly to the second operation. However, in the fifth operation, each of the pixels 201 is not irradiated with the radiation, and accordingly accumulates an electric signal therein according to the electric charge which has been generated by the dark current. When the fifth operation has ended, the control unit 108 shifts the operation to a sixth operation.

In the sixth operation, the drive unit 102 successively supplies a conducting voltage of the signals G1 to G8 to the gates of the transistors $T_{mn}$ in at least one row out of a plurality of rows of the plurality of pixels 201, for a plurality of rows. The sixth operation is a read out operation of reading out an electric signal (pixel signal in dark time) according to the electric charge which has been generated by the dark current, from each of the pixels 201, to the processing unit 106. The pixel signal in the dark time includes a signal for correcting an offset component which the pixel 201 has. The signal processing unit 105 calculates a difference between a first image signal that has been read out in the third operation and a second image signal in the dark time, which has been read out in the sixth operation, and outputs the calculated difference as a radiation image. By this correction of the difference, a radiation image can be obtained from which the offset component has been removed. For information, this processing for the difference may be performed in another processing apparatus which is provided in the outside of the radiation imaging apparatus 100.

Next, the most suitable first operation will be described below. When the radiation imaging apparatus is structured so that the electric-current detecting unit 508 detects an electric current of the bias line 202 and detects the start of the irradiation of the radiation, and the like, as has been described above, there exist the following problems. Specifically, a part of a signal electric charge which has been generated by the irradiation of the radiation results in being lost from the conversion element $S_{mn}$ in which the reset operation has been performed in a period between the start of the irradiation of the radiation and the detection of the start of the irradiation of the radiation. Because of this, as the conducting time period of the transistor $T_{mn}$ in the reset operation is longer, the influence becomes larger. For this reason, it is desirable to shorten the conducting time period of the transistor $T_{mn}$ in the reset operation, in order to obtain an image having a small artifact. However, when the conducting time period of the transistor $T_{mn}$ is shortened, an effect of resetting the electric charge which has been generated by the dark current in the reset operation results in being decreased. Specifically, the electric charge which has been generated by the dark current cannot be sufficiently reset, and results in remaining in the conversion element $S_{mn}$. For this reason, it is necessary to secure the minimum conducting time period during which the electric charge is sufficiently reset.

Then, in the first operation, when a time period during which the conducting voltage of the signals G1 to G8 is supplied to each of the gates of a plurality of transistors $T_{11}$ to $T_{88}$ is represented by $\Delta$Ton, it is recommendable that a relationship of $\Delta$Ton$\geq$3$\times$$\tau$ holds. Here, $\tau$ is a time constant of a transfer efficiency of the transistors $T_{11}$ to $T_{88}$ in the pixels 201. In the radiation imaging apparatus 100, usually, $\tau$ is approximately 2 to 5 $\mu$s, and accordingly $\Delta$Ton is desirably 6 to 15 $\mu$s. In addition, the radiation imaging apparatus 100 has approximately 3,000 rows of scanning lines of the signals G1 to G3000, and accordingly the time period $\Delta$K of the reset operation results in being approximately 18 ms to 45 ms.

In addition, in the present embodiment, the accumulation operation is performed after the above described reset operation. This procedure prevents the time cycle of the reset operation from being shortened. Here, the most suitable time cycle of the first operation for acquiring a radiation image having a small artifact and enhancing the capability of detecting the radiation will be described below, which are the objects of the present embodiment. The time cycle $\Delta$K+W of the first operation shall be determined by the two following points.
(1) Maximum value of irradiation time period of a radiation to be used in diagnosis
(2) Preview time period after radiation photographing As for the point (1), the maximum value of the irradiation time period of the radiation to be used in the diagnosis is approximately 500 ms. Because of this, it is acceptable that the radiation of 500 ms can be detected.

As for the point (2), the radiation imaging apparatus 100 generally has a function of pre-displaying an acquired image immediately after the radiation photographing. A time period between the end of the radiation photographing and the start of the pre-display is referred to as a preview time period. This preview time period is desirably 3 s or shorter. In the timing chart illustrated in FIG. 3, the preview time period is a period between the start of the third operation and the end of the sixth operation. Here, in a general radiation imaging apparatus 100 for photographing a still image, the time periods of the third operation and the sixth operation are each approximately 500 ms, and the time period of the fifth operation is approximately 1 s. Therefore, the fourth operation is desirably approximately 1 s. In addition, as has been described above, it is desirable that the time cycle of the first operation in the fourth operation is performed twice or more times. Therefore, the time cycle $\Delta$K+W of the first operation and the time cycle $\Delta$K+W of the fourth operation are desirably 500 ms or less.

From the above described points (1) and (2), in the present embodiment, the time cycle of the first operation is desirably approximately 500 ms.

An effect of the present embodiment is illustrated in FIG. 4. As in the present embodiment, by shortening the conducting time period $\Delta$Ton of the transistor $T_{mn}$ in the reset operation, the artifact on the image can be decreased, which is caused by a phenomenon that a part of a signal electric charge which has been generated by the irradiation of the radiation results in being lost. In addition, when only the reset operation is performed in the first operation, the time cycle $\Delta$K of the first operation is shortened, and the detecting capability results in being lowered. In contrast to this, when not only the reset operation but also the accumulation operation after the reset operation is performed in the first operation, as in the present embodiment, the time cycle $\Delta$K+W of the first operation can be lengthened, and the detecting capability is enhanced. Thereby, the time period between the start of the irradiation of the radiation and the detection of the start of the irradiation of the radiation can be lengthened. Specifically, as is illustrated in FIG. 4, the detecting capability can be enhanced in the region in which the irradiation time period of the radiation is long, and the radiation can also be detected which has a long irradiation time period and is weak.

Figure 5:
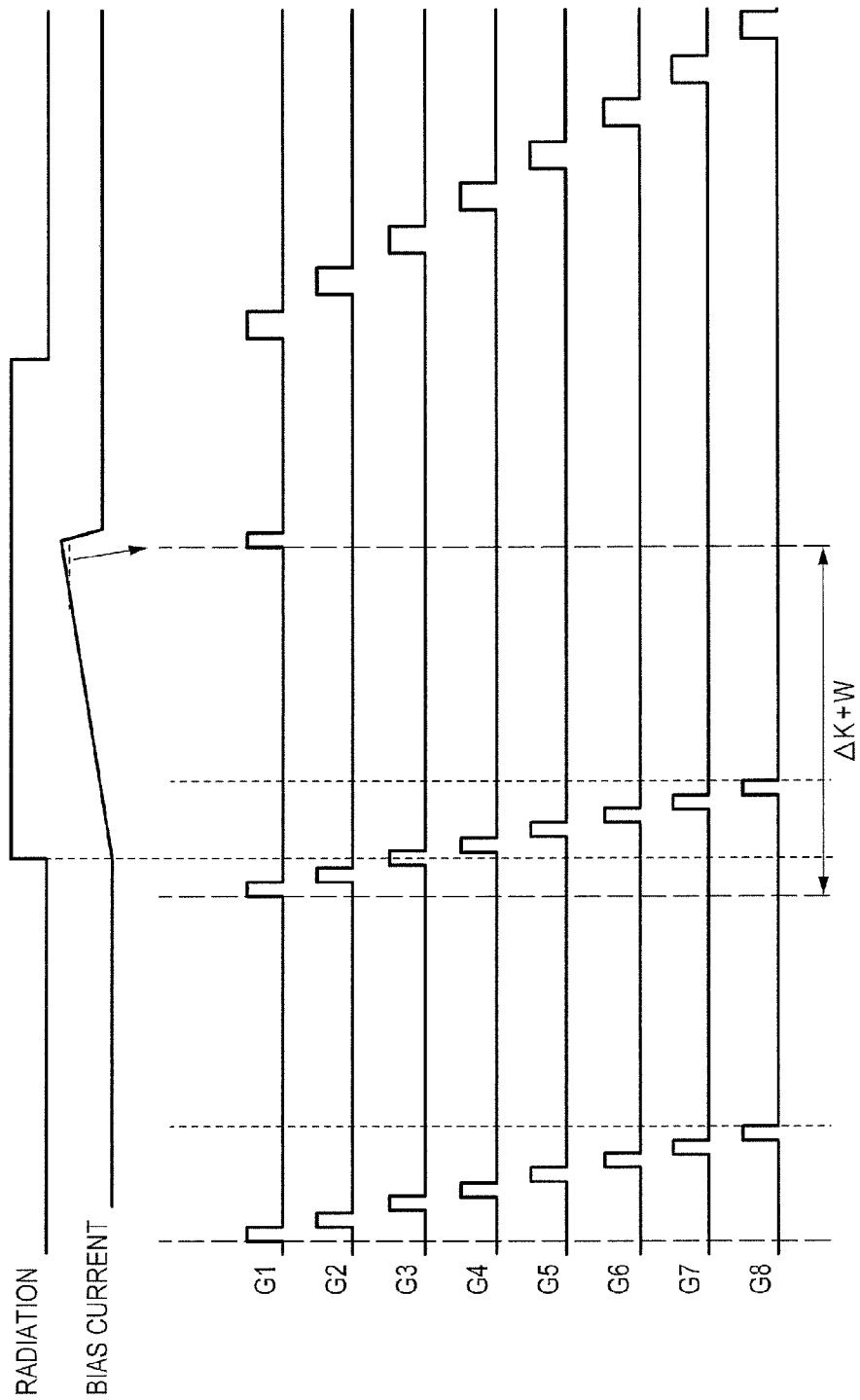
FIG. 5 is a view for describing an effect of the first embodiment.

In addition, another effect of the present embodiment will be described below with reference to FIG. 5. In the present embodiment, in the first operation, the reset operation and the accumulation operation are alternately performed, and the irradiation of the radiation is waited. By the start of the irradiation of the radiation, as is illustrated in FIG. 5, a bias current which flows in the bias line 202 starts flowing. This bias current flows with a size according to an accumulation time period from the start of the irradiation of the radiation, in other words, a time period from the start of the irradiation of the radiation to the time when the conducting voltage of the signals G1 to G8 is supplied to the gates of the transistors $T_{mn}$ in each of the rows. Because of this, in the case where the accumulation time period is inserted after the reset operation, as in the present embodiment, when the bias current in the row of the signal G8 is compared to the bias current in the row of the signal G1 after the accumulation operation, the latter bias current is larger and is in a highly detectable state. For this reason, in the present embodiment, there is a high possibility that the irradiation of the radiation is detected in the row of the signal G1 after the accumulation operation. In the radiation imaging apparatus 100, the row of the signal G1 is the row in the uppermost end, and accordingly there is a high possibility that the row becomes a region which is not used in the image diagnosis. Specifically, the artifact in the row of the signal G1 resists causing a problem in the image diagnosis. This fact is greatly advantageous for the radiation imaging apparatus 100 which can detect the start of the irradiation of the radiation.

Figure 6:
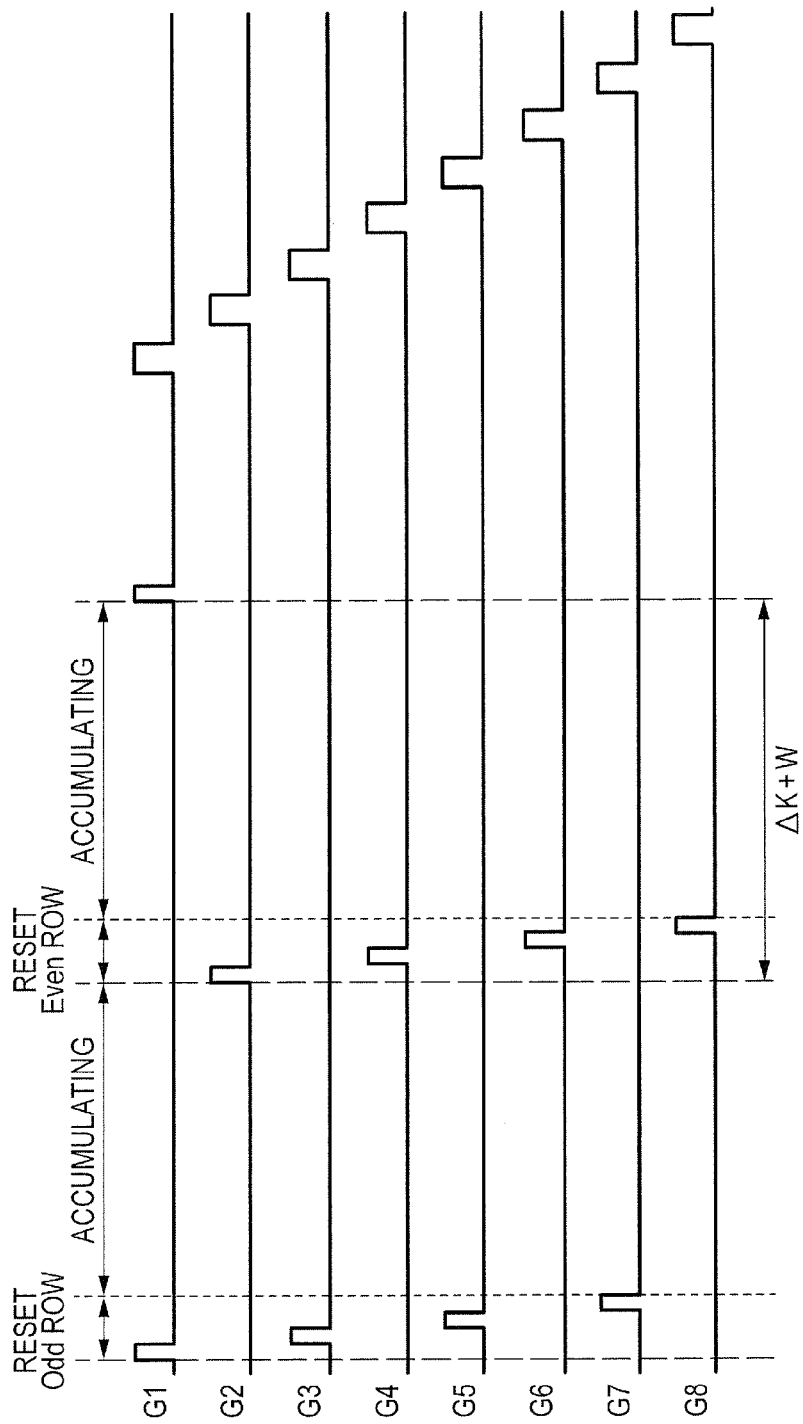
FIG. 6 is a timing chart illustrating another driving method of the first embodiment.

FIG. 6 describes another driving method of the first operation in FIG. 3. In FIG. 6, the order of the reset operation for each of the rows of the signals G1 to G8 is different. In the first operation, firstly, the reset operation for the odd rows is performed, and subsequently the accumulation operation is performed. Next, the reset operation for the even rows is performed, and subsequently the accumulation operation is performed. In the first operation, the four operations which are regarded as one time cycle are repeatedly performed before the radiation imaging apparatus is irradiated with the radiation. In the reset operation for the odd rows, the signals G1, G3, G5 and G7 of the odd rows are sequentially set at a conducting voltage. In the reset operation for the even rows, the signals G2, G4, G6 and G8 of the even rows are sequentially set at a conducting voltage. In this case, at next timing at which the conducting voltage of the signals G1 to G8 has been supplied to the gates of the transistors $T_{mn}$ in a certain row, the conducting voltage of the signals G1 to G8 is supplied to the gates of the transistors $T_{mn}$ in rows other than the adjacent rows to the certain row. An artifact on an image occasionally occurs due to a phenomenon that a part of a signal electric charge which has been generated by the irradiation of the radiation is lost from a conversion element $S_{mn}$ in which the reset operation has been performed before the start of the irradiation of the radiation is detected. In that case, the present embodiment is an effective operation technique when the artifact is corrected with the use of data of a pixel other than the pixel in which the part of the signal electric charge has been lost. According to this operation technique, even when the signal electric charge of the pixel has been lost, the signal electric charges in adjacent pixels to the pixel are not lost, and accordingly when the artifact is corrected, the artifact can be corrected with the use of the data in the adjacent pixel. As is illustrated in FIG. 6, when the operation of sequentially supplying the conducting voltage to the signals G2, G4, G6 and G8 of the even rows has been performed after the conducting voltage has been sequentially supplied to the signals G1, G3, G5 and G7 of the odd rows, the time cycle of the reset operation becomes a half of the reset operation in FIG. 3. Also in such an operation, when the accumulation operation is performed, the detecting capability in a region in which the irradiation time period of the radiation is long can be enhanced.

Figure 7:
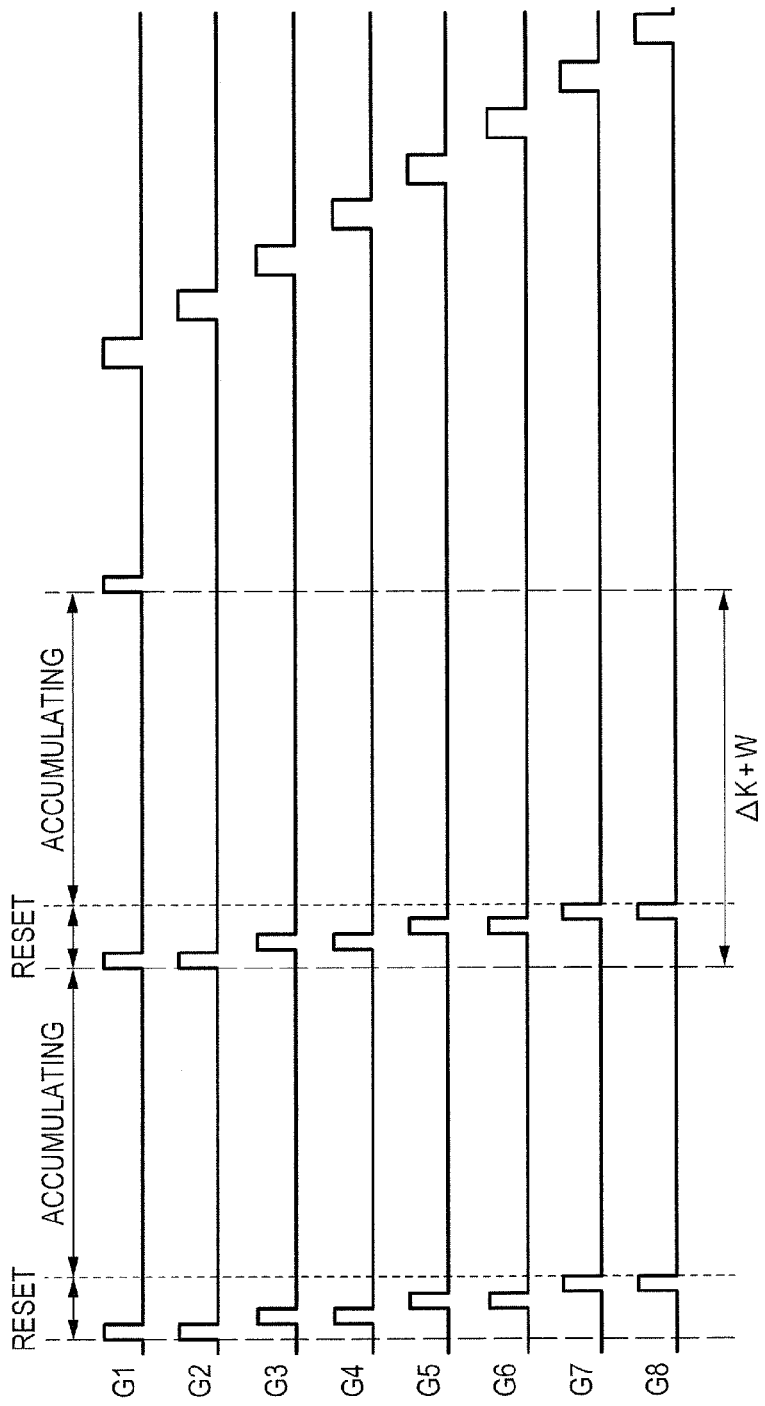
FIG. 7 is a timing chart illustrating another driving method of the first embodiment.

FIG. 7 describes further another driving method of the first operation in FIG. 3. FIG. 7 illustrates the case where the reset operation of the first operation in FIG. 3 is performed two rows by two rows. Firstly, the signals G1 and G2 of the two rows are set at a conducting voltage, and subsequently the signals G3 and G4 of the two rows are set at a conducting voltage. Next, the signals G5 and G6 of the two rows are set at a conducting voltage, and subsequently the signals G7 and G8 of the two rows are set at a conducting voltage. Thereby, the amount of an electric current which flows in the bias line 202 are doubled, and the detecting capability can be enhanced. In such a case, the time cycle of the reset operation becomes a half of the time cycle of the reset operation in FIG. 3. Also in such an operation, when the accumulation operation is performed, the detecting capability in a region in which the irradiation time period of the radiation is long can be enhanced.

Figure 8:
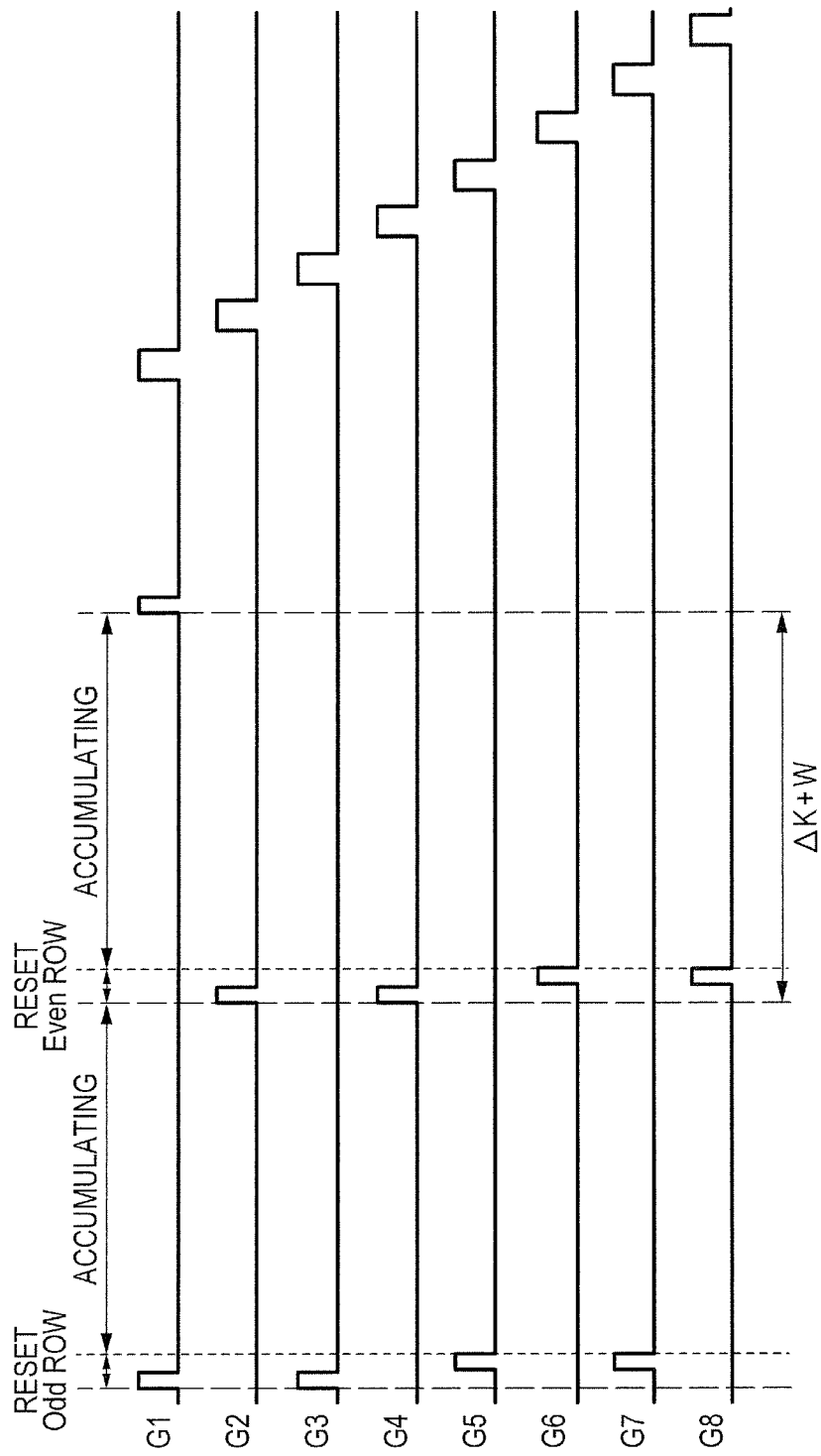
FIG. 8 is a timing chart illustrating another driving method of the first embodiment.

FIG. 8 describes further another driving method of the first operation in FIG. 3. In FIG. 8, similarly to FIG. 6, in the first operation, firstly, the reset operation for the odd rows is performed, and subsequently the accumulation operation is performed. Next, the reset operation for the even rows is performed, and subsequently the accumulation operation is performed. In the first operation, the four operations which are regarded as one time cycle are repeatedly performed before the radiation imaging apparatus is irradiated with the radiation. In the reset operation for the odd rows, the reset operation is performed two rows by two rows. Firstly, the signals G1 and G3 of the two rows of the odd rows are set at a conducting voltage, and subsequently the signals G5 and G7 of the two rows of the odd rows are set at a conducting voltage. Also in the reset operation for the even rows, the reset operation is performed two rows by two rows. Firstly, the signals G2 and G4 of the two rows of the even rows are set at the conducting voltage, and subsequently the signals G6 and G8 of the two rows of the even rows are set at the conducting voltage. As has been described above, firstly, the conducting voltage is sequentially supplied to the signals of the odd rows two rows by two rows, and the reset operation for the odd rows is performed. Subsequently, the accumulation operation is performed. Next, the conducting voltage is sequentially supplied to the signals of the even rows two rows by two rows, and the reset operation for the even rows is performed. Subsequently, the accumulation operation is performed. Thereby, the amount of an electric current which flows in the bias line 202 is doubled, the detecting capability can be enhanced, and an artifact on an image, which is caused by a phenomenon that a part of a signal electric charge is lost, can be corrected with the use of the data of the adjacent pixel. In this case, the time cycle of the reset operation becomes a quarter of the time cycle of the reset operation in FIG. 3. Also in such an operation, when the accumulation operation is performed, the detecting capability in a region in which the irradiation time period of the radiation is long can be enhanced.

As has been described above, the present embodiment is not limited to the form of the reset operation, and the accumulation operation can be performed after various forms of the reset operations. In addition, in the present embodiment, when the time cycle of the first operation is longer, the radiation continuing longer can be detected. However, when the time cycle of the first operation is set to be excessively long, the above described preview time period results in becoming long. This results in causing the aggravation of the operability of the radiation imaging apparatus 100. Therefore, the time cycle of the first operation is sufficient as long as the maximum irradiation time period of the radiation to be used in the diagnosis is secured.

Second Embodiment

Figure 9:
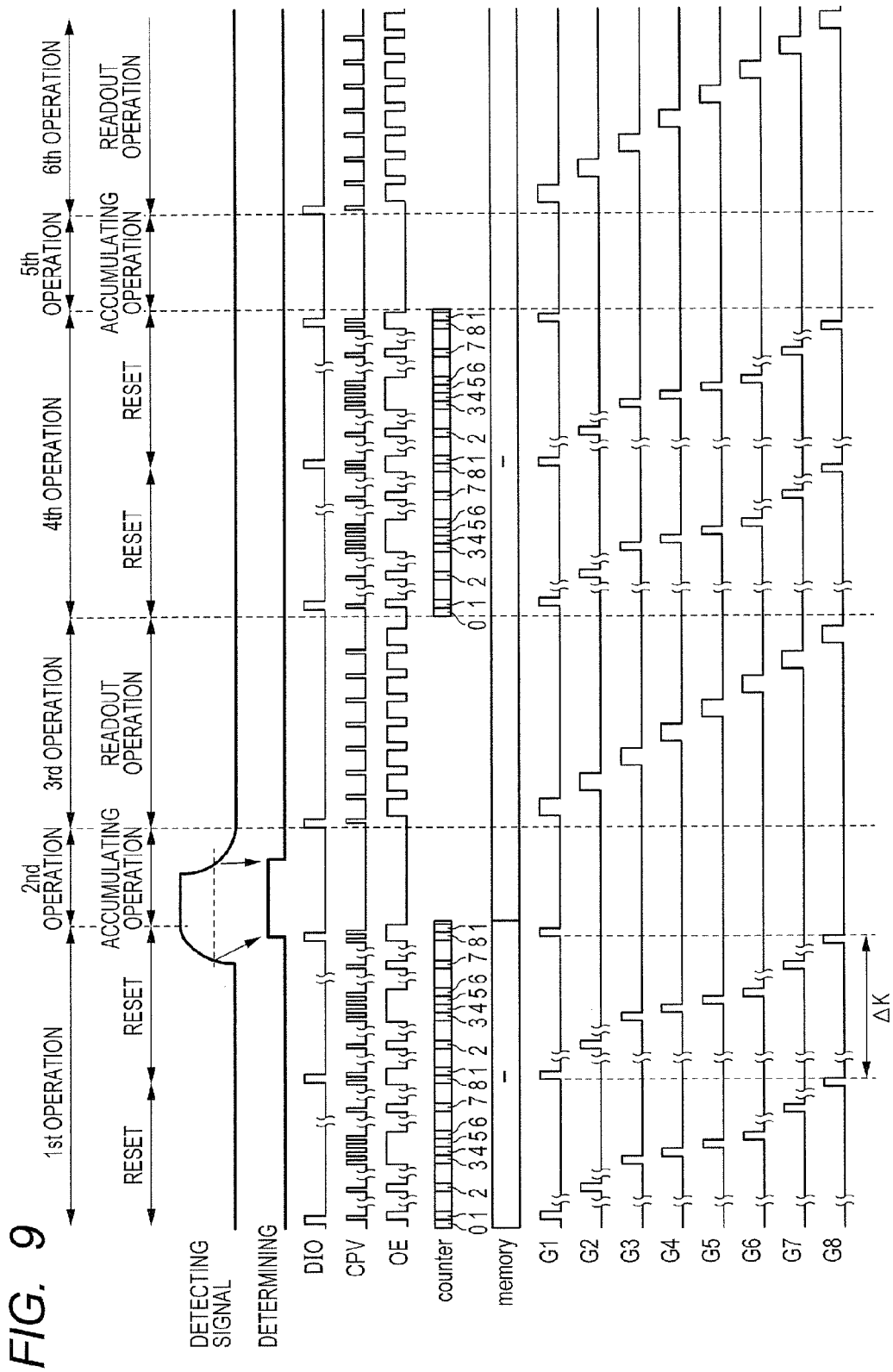
FIG. 9 is a timing chart illustrating a driving method according to a second embodiment.
Figure 10:
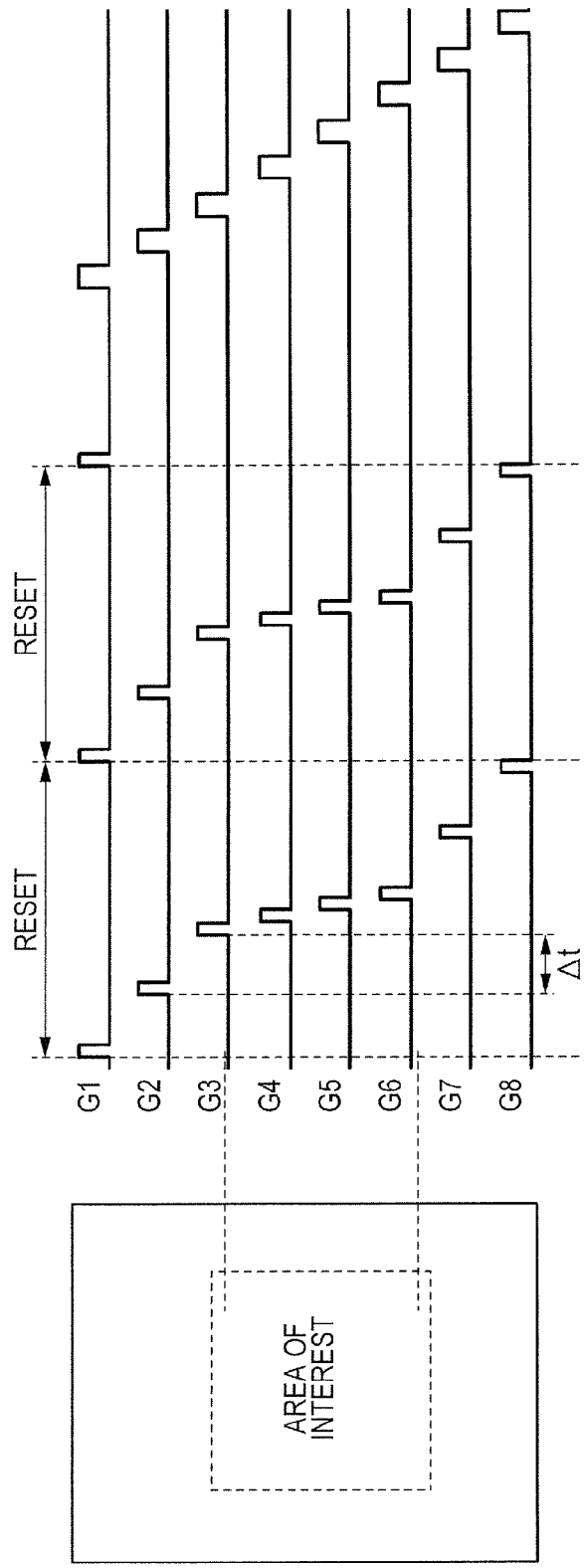
FIG. 10 is a view for describing the driving method according to the second embodiment.

FIG. 9 and FIG. 10 are timing charts for describing an operation of a radiation system according to a second embodiment of the present invention. FIG. 9 illustrates a state of an operation of the imaging unit 101, an output value of a detecting signal 507 for detecting that the radiation imaging apparatus has been irradiated with the radiation, and a determination result of the detecting signal 507, sequentially from above. Furthermore, the signals DIO, CPV and OE, the counter which is a counter value of the counter CNT, and an information memory which is memorized in the memory unit M, are illustrated in the underside thereof. In the underside thereof, the signals G1 to G8 are illustrated. Hereafter, a point will be described in which the present embodiment is different from the first embodiment.

The first operation of the present embodiment is different from that in the first embodiment in which the reset operation and the accumulation operation are alternately performed, and repeatedly performs only a reset operation at a plurality of times. However, a period $\Delta t$ (FIG. 10) between the time when the transistors $T_{mn}$ in a certain row are set at a conducting state and the time when the transistors $T_{mn}$ in the next row are set at a conducting state can be set so as to be different among each row. In FIG. 10, the above described period $\Delta t$ is changed between the signals G3 to G6 of the row within the area of the interest, which becomes important in the image diagnosis, and the signals G1, G2, G7 and G8 in the outside of the area of the interest, which is not used in the image diagnosis. Specifically, the period $\Delta t$ is set to be long in the signals G1, G2, G7 and G8 in the outside of the area of the interest, and the period $\Delta t$ is set to be short in the signals G3 to G6 within the area of the interest. In the case where the radiation imaging apparatus 100 is formed, for instance, from 3,000 rows of the pixels 201, when 2,000 rows in the center area form the area of the interest, the period $\Delta t$ is set at 10 μs in the 2,000 rows in the area of the interest. In addition, when each group of 500 rows in the peripheral area is in the outside of the area of the interest, the period $\Delta t$ is set at 480 μs in the total 1,000 rows in the outside of the area of the interest. Thereby, the time cycle of the first operation can be set at 500 ms.

Similarly to the first embodiment, the control unit 108 controls the drive unit 102 so that the drive unit 102 stops the first operation by stopping the supply of a conducting voltage of the signals G1 to G8 in the first operation in response to the irradiation of the radiation and shifts the operation to a second operation. The second operation, the third operation, the fifth operation and the sixth operation according to the present embodiment are similar to the operations described in the first embodiment. The fourth operation can be ended after the above described time cycle of the first operation has been repeatedly performed twice or more times.

Next, an effect of the present embodiment will be described. An artifact on an image due to a phenomenon that a part of a signal electric charge is lost from a conversion element $S_{mn}$ in which the reset operation has been performed before the start of the irradiation of the radiation is detected occurs according to the accumulation time period from the start of the irradiation of the radiation. This is because as the accumulation time period from the start of the irradiation of the radiation is long, the amount of the electric charge to be lost becomes large. Specifically, the artifact becomes large in the row in which the period Δt in FIG. 10 is long. In the image diagnosis, the artifact is desirably small within the area of interest. For this reason, in the present embodiment, the period Δt is shortened within the area of the interest. In addition, the start of the irradiation of the radiation is desirably detected in the outside of the area of the interest. Because of this, the radiation imaging apparatus is structured so that the period Δt is set to be long in the outside of the area of the interest, and the start of the irradiation of the radiation is detected in the outside of the area of the interest.

As has been described in the first embodiment, when the reset operation is shortened, the detecting capability for the irradiation of the radiation which has a long irradiation time period and is weak results in being lowered. According to the present embodiment, the period Δt is set to be long in the outside of the area of the interest, and thereby the time period of the reset operation can be lengthened. Accordingly, the artifact within the area of the interest is decreased and the capability of detecting the irradiation of the radiation can be enhanced.

In addition, in FIG. 10, the length of the period Δt is changed between the inside of the area of the interest and the outside of the area of the interest, but the method is not limited to this method. The radiation imaging apparatus 100 includes a dummy pixel which is not used in the image diagnosis. The period Δt may be set to be long only in the row of this dummy pixel.

As has been described above, according to the first and second embodiments, the drive unit 102 performs the first operation of performing the reset operation at a plurality of times, by supplying the conducting voltage to the gates of the transistors $T_{11}$ to $T_{88}$, successively, one row by one row, at least. Next, the drive unit 102 performs the second operation of stopping the supplying of the conducting voltage in response to detecting the irradiation of the radiation by the detecting unit 508, and of performing an accumulation operation by supplying the non-conducting voltage to the gates of the plurality of transistors $T_{11}$ to $T_{88}$. Next, the drive unit 102 performs the third operation of performing, after the second operation, a read out operation by supplying the conducting voltage to the gates of the transistors $T_{11}$ to $T_{88}$, successively, one row by one row. Next, the drive unit 102 performs the fourth operation of performing, after the third operation, the reset operation at a plurality of times, by supplying the conducting voltage to the gates of the transistors $T_{11}$ to $T_{88}$, successively, one row by one row, at least. Next, the drive unit 102 performs the fifth operation of performing, after the fourth operation, the accumulation operation by supplying the non-conducting voltage to the gates of the plurality of transistors $T_{11}$ to $T_{88}$. Next, the drive unit 102 performs the sixth operation of ending the fourth operation, after the fifth operation, and of performing the read out operation by supplying the conducting voltage to the gates of the transistors $T_{11}$ to $T_{88}$, successively, one row by one row.

In the first operation, a period between the time when the conducting voltage is supplied to the gates of the transistors in a certain row and the time when the conducting voltage is supplied subsequently to the gates of the transistors in another row shall be a first period. Then, a period between the time when the conducting voltage is supplied to the gates of the transistors in the another row and the time when the conducting voltage is supplied subsequently to the gates of the transistors in further another row shall be a second period. In this case, the first period is different from the second period.

In the first embodiment, a driving method in FIG. 3 is performed. In the first operation, a period between the reset operation for all of the rows and the reset operation for all of the next rows shall be a third period. Then, a period between the time when the conducting voltage is supplied to the gates of the transistors in a certain row in the reset operation for all of the rows and the time when the conducting voltage is supplied subsequently to the gates of the transistors in another row shall be a fourth period. In this case, the third period is longer than the fourth period.

In the second embodiment, a driving method in FIG. 9 and FIG. 10 is performed. In the first operation, a period between the time when the conducting voltage is supplied to the gates of the transistors of the rows in the center area of the plurality of conversion elements $S_{11}$ to $S_{88}$ in a two-dimensional matrix form and the time when the conducting voltage is supplied subsequently to the gates of the transistors in another row shall be a fifth period. Then, a period between the time when the conducting voltage is supplied to the gates of the transistors in the rows in the peripheral area of the plurality of conversion elements $S_{11}$ to $S_{88}$ in a two-dimensional matrix form and the time when the conducting voltage is supplied subsequently to the gates of the transistors in another row shall be a sixth period. The fifth period is shorter than the sixth period.

When the first operation is performed, the time cycle ΔK+W of the first operation can be lengthened, accordingly a high-quality radiation image can be acquired, and the capability of detecting the radiation can be enhanced.

Note that the above embodiments are merely examples how the present invention can be practiced, and the technical scope of the present invention should not be restrictedly interpreted by the embodiments. In other words, the present invention can be practiced in various ways without departing from the technical concept and main features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-118992, filed Jun. 5, 2013, which is hereby incorporated by reference herein in its entirety.

What is claimed is:

1. A radiation imaging apparatus comprising:
    a plurality of conversion elements configured to convert radiation into an electric charge and arranged in a matrix;
    a plurality of transistors connected between the plurality of conversion elements and a read out circuit;
    a drive unit configured to supply, to a gate of the transistor, selectively, a conducting voltage setting the transistor at a conducting state and a non-conducting voltage setting the transistor at a non-conducting state; and
    a detecting unit configured to detect an irradiation of the radiation, wherein the drive unit performs:
    a first operation of performing a reset operation at a plurality of times by supplying the conducting voltage to the gates of the plurality of transistors, successively, one row by one row, at least;
    a second operation of stopping the supplying of the conducting voltage in response to detecting the irradiation of the radiation by the detecting unit and of performing an accumulating operation by supplying the non-conducting voltage to the gates of the plurality of transistors; and a third operation of performing, after the second operation, a read out operation by supplying the conducting voltage to the gates of the plurality of transistors, successively, one row by one row, and, during the first operation, a period between a time of supplying the conducting voltage to the gates of the transistor in one row and a time of supplying the conducting voltage to the gates of the transistor in a next row is different from a period between a time of supplying the conducting voltage to the gates of the transistor in the next row and a time of supplying the conducting voltage to the gates of the transistor in a further next row.

2. The radiation imaging apparatus according to claim 1 further comprising;

a bias line configured to apply a bias voltage to the plurality of conversion elements, wherein the detecting unit detects the irradiation of the radiation, based on a current flowing in the bias line.

3. The radiation imaging apparatus according to claim 1, wherein the drive unit performs:

a fourth operation, after the third operation, of performing the reset operation at a plurality of times by supplying the conducting voltage to the gates of the plurality of transistors, successively, one row by one row, at least;

a fifth operation, after the fourth operation, of performing an accumulating operation by supplying the non-conducting voltage to the gates of the plurality of transistors; and a sixth operation of performing, after the fifth operation, a read out operation by supplying the conducting voltage to the gates of the plurality of transistors, successively, one row by one row.

4. The radiation imaging apparatus according to claim 1, wherein, during the first operation, a period between a reset operation for all rows and a next reset operation for the all rows is longer than a period between a time of supplying the conducting voltage to the gates of the plurality of transistors in one row and a time of supplying the conducting voltage to the gates of the plurality of transistors in a next row.

5. The radiation imaging apparatus according to claim 1, wherein, during the first operation, a period between a time of supplying the conducting voltage to the gates of the transistors in one row in the center area of the plurality of conversion element in the matrix and a time of supplying the conducting voltage to the gates of the transistors in a next row in the center area of the plurality of conversion element in the matrix is shorter than a period between a time of supplying the conducting voltage to the gates of the transistors in one row in a peripheral area of the plurality of conversion element in the matrix and a time of supplying the conducting voltage to the gates of the transistors in a next row in the peripheral area of the plurality of conversion element in the matrix.

6. The radiation imaging apparatus according to claim 3, wherein the reset operation at each time in the fourth operation is the same as the reset operation at each time in the first operation.

7. The radiation imaging apparatus according to claim 1, wherein the first operation meets a relation: $\Delta Ton \geq 3 \times \tau$, in which $\Delta Ton$ is a period for supplying the conducting voltage to each of the gates of the plurality of transistors, and T is a time constant of a transfer efficiency of the transistor.

8. A radiation imaging system comprising:

a radiation imaging apparatus according to claim 1; and a radiation source irradiating the radiation through an object onto the radiation imaging apparatus.

* * * * *